(12) United States Patent
McKay et al.

(10) Patent No.: US 9,725,295 B2
(45) Date of Patent: Aug. 8, 2017

(54) SYSTEM AND METHOD FOR DISTRIBUTING FUEL

(71) Applicant: 1119456 B.C. Ltd., Kelowna (CA)

(72) Inventors: Stephen William McKay, West Kelowna (CA); Robert Michael Estok, West Kelowna (CA); Neil Joseph Ladd, West Kelowna (CA)

(73) Assignee: 1119456 B.C. Ltd., Kelowna (CA)

( * ) Notice: Subject to any disclaimer, the term of this patent is extended or adjusted under 35 U.S.C. 154(b) by 0 days.

(21) Appl. No.: 14/877,823

(22) Filed: Oct. 7, 2015

(65) Prior Publication Data

US 2017/0101305 A1    Apr. 13, 2017

(51) Int. Cl.
| | | |
|---|---|---|
| *B67D 7/04* | (2010.01) | |
| *B67D 7/32* | (2010.01) | |
| *B67D 7/78* | (2010.01) | |
| *F16L 41/03* | (2006.01) | |
| *F16L 29/00* | (2006.01) | |

(52) U.S. Cl.
CPC .............. *B67D 7/3272* (2013.01); *B67D 7/04* (2013.01); *B67D 7/78* (2013.01); *F16L 29/00* (2013.01); *F16L 41/03* (2013.01)

(58) Field of Classification Search
CPC .......... B67D 7/3272; B67D 7/04; B67D 7/06; B67D 7/78; F16L 29/00; F16L 41/03
USPC .......... 141/1, 5, 94–95, 192, 198, 236–237, 141/242–244
See application file for complete search history.

(56) References Cited

U.S. PATENT DOCUMENTS

| | | | | |
|---|---|---|---|---|
| 4,765,359 A | * | 8/1988 | Burnett ................. | B60K 15/00 137/255 |
| 6,311,723 B1 | | 11/2001 | Shipp et al. | |
| | | (Continued) | | |

FOREIGN PATENT DOCUMENTS

| | | |
|---|---|---|
| CA | 2693567 | 10/2010 |
| CA | 2349665 | 2/2011 |
| | (Continued) | |

OTHER PUBLICATIONS

International Searching Authority, The International Search Report and the Written Opinion of the Searching Authority, or the Declaration, International Application No. PCT/CA2016/051154, Filed Dec. 21, 2016, 8 pages, Receiving Office—Canadian Intellectual Property Office.

*Primary Examiner* — Nicolas A Arnett
(74) *Attorney, Agent, or Firm* — Richard D. Okimaw

(57) ABSTRACT

Disclosed is a system and method for delivering fuel to a plurality of vehicles. The system comprises a fuel source, a pump operable to draw fuel from the fuel source and a distribution manifold having a plurality of outlets. The system further comprises a plurality of fuel lines extending from the distribution manifold and a plurality of valve assemblies, each located in a tank of one of the plurality of vehicles each of the valve assembly being operable to independently shut off flow of fuel therethrough when the tank is filled to a predetermined level. The method comprises pumping the fuel supply from the fuel source to the distribution manifold, connecting a plurality of fuel lines to the distribution manifold and a valve assembly in each of a plurality of trucks in connection with one of the fuel lines.

8 Claims, 3 Drawing Sheets

(56) References Cited

U.S. PATENT DOCUMENTS

| | | | |
|---|---|---|---|
| 7,628,182 B2* | 12/2009 | Poulter | B67D 7/36 137/263 |
| 8,069,710 B2 | 12/2011 | Dodd et al. | |
| 8,430,117 B2* | 4/2013 | Mitrovich | B67D 7/365 137/413 |
| 8,631,818 B2* | 1/2014 | Mitrovich | B60K 15/04 137/429 |
| 8,794,307 B2 | 8/2014 | Coquilleau et al. | |
| 9,346,662 B2* | 5/2016 | Van Vliet | B67D 7/04 |
| 9,371,830 B2* | 6/2016 | Moffitt, Jr. | F04B 49/225 |
| 9,371,831 B2* | 6/2016 | Moffitt, Jr. | F04B 49/225 |
| 2007/0181212 A1 | 8/2007 | Fell | |
| 2011/0197988 A1 | 8/2011 | Van Vliet et al. | |
| 2012/0160013 A1* | 6/2012 | Jarvie | G01M 3/2892 73/40.5 R |
| 2014/0090742 A1 | 4/2014 | Coskrey et al. | |
| 2015/0047738 A1 | 2/2015 | Wilson et al. | |
| 2016/0076532 A1* | 3/2016 | Moffitt, Jr. | F04B 49/225 137/565.13 |
| 2016/0076533 A1* | 3/2016 | Moffitt, Jr. | F04B 49/225 137/565.13 |

FOREIGN PATENT DOCUMENTS

| | | |
|---|---|---|
| CA | 2925459 | 3/2014 |
| CN | 203602349 | 5/2014 |
| CN | 203639140 | 6/2014 |
| CN | 203728562 | 7/2014 |
| WO | 0144104 | 6/2001 |
| WO | 2012103498 | 8/2012 |

* cited by examiner

SYSTEM AND METHOD FOR DISTRIBUTING FUEL

BACKGROUND OF THE INVENTION

1. Field of Invention

The present invention relates generally to refueling systems and in particular to a system and method for distributing fuel to a plurality of continuously running vehicles.

2. Description of Related Art

Many industrial processes require the use of multiple vehicles to be operated continuously at a worksite. One example of such environments is at a hydraulic fracturing or fracking site. In such locations, multiple pump trucks are required to provide the fracking site with sufficient fracking fluid. Such trucks are disadvantageously required to be operated continuously during such fracking operations and therefore will also be required to be refueled during operation.

One common difficulty with such fracking operations is the need to refuel the multiple trucks to ensure continued operation. One common method of refueling such trucks is to provide a fuel tank and personnel to monitor and refill the tank on each truck as needed. It will be appreciated that such methods are time consuming and prone to error if sufficient personnel are not present. Additionally, the fuel lines required for filling each truck may pose a safety hazard when distributed around the worksite.

Other methods have attempted to provide a system of automatically distributing fuel to such trucks by providing sensors in each truck with a valve and manifold assembly at the common source tank. Such systems, disadvantageously however require the use of electrical sensors which may pose spark risk at the work site and also disadvantageously depressurize each of the fuel lines to each truck reducing the responsiveness of supply each truck. Examples of such systems may be found in US Patent Application Publication No. 2011/0197988 to Van Vliet et al.

SUMMARY OF THE INVENTION

According to a first embodiment of the present invention there is disclosed a system for delivering fuel to a plurality of vehicles comprising a fuel source, a pump operable to draw fuel from the fuel source and a distribution manifold having a plurality of outlets, the distribution manifold in open fluidic communication with the pump. The system further comprises a plurality of fuel lines, each of the plurality of fuel lines connected in free fluidic connection one of the outlets of the distribution manifold and a plurality of valve assemblies, each located in a tank of one of the plurality of vehicles open fluidic communication with each of the plurality of fuel lines, each of the valve assembly being operable to independently shut off flow of fuel therethrough when the tank is filled to a predetermined level.

The system may further comprise a control circuit adapted to control the operation of the pump. The control circuit is adapted to turn on the pump for a run period of time sufficient to fill the tanks of the plurality of vehicles after which the control module turns the pump off. The control circuit is adapted to turn on the pump after an interval period of time sufficient to empty the tanks of the plurality of vehicles to a predetermined volume.

The system may further comprise a pressure sensor in the distribution manifold. The control circuit is adapted to turn off the pump when the pressure sensor detects a pressure drop greater than a predetermined level.

Each of the valve assemblies comprise a mechanical valve. Each of the mechanical valve assemblies are adapted to a shut off a flow of fuel therethrough upon detecting that the tank is full. The mechanical valve includes a biased piston slidably locatable within a housing and having a sealing face adapted to be sealed into contact with the housing when the tank is filled to the predetermined level. The piston includes a bore therethrough in fluidic communication with a float valve operable to be closed when the tank is filled to the predetermined level.

According to a further embodiment of the present invention there is disclosed a method for delivering fuel to a plurality of vehicles comprising providing a fuel source containing a fuel supply, pumping the fuel supply from the fuel source to a distribution manifold having a plurality of outlets, the distribution manifold in open fluidic communication with the pump and connecting a plurality of fuel lines in free fluidic connection one of the outlets of the distribution manifold. The method further comprises locating a valve assembly in each of a plurality of trucks and connecting each of the valve assemblies in open fluidic communication with each of the plurality of fuel lines, each of the valve assembly being operable to independently shut off flow of fuel therethrough when the tank is filled to a predetermined level.

The method may further comprise providing a control circuit adapted to control the operation of the pump. The control circuit is adapted to turn on the pump for a run period of time sufficient to fill the tanks of the plurality of vehicles after which the control module turns the pump off. The control circuit is adapted to turn on the pump after an interval period of time sufficient to empty the tanks of the plurality of vehicles to a predetermined volume.

The method may further comprise a pressure sensor in the distribution manifold. The control circuit is adapted to turn off the pump when the pressure sensor detects a pressure drop greater than a predetermined level.

Each of the valve assemblies comprises a mechanical valve. Each of the mechanical valve assemblies are adapted to a shut off a flow of fuel therethrough upon detecting that the tank is full. The mechanical valve includes a biased piston slidably locatable within a housing and having a sealing face adapted to be sealed into contact with the housing when the tank is filled to the predetermined level. The piston includes a bore therethrough in fluidic communication with a float valve operable to be closed when the tank is filled to the predetermined level.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
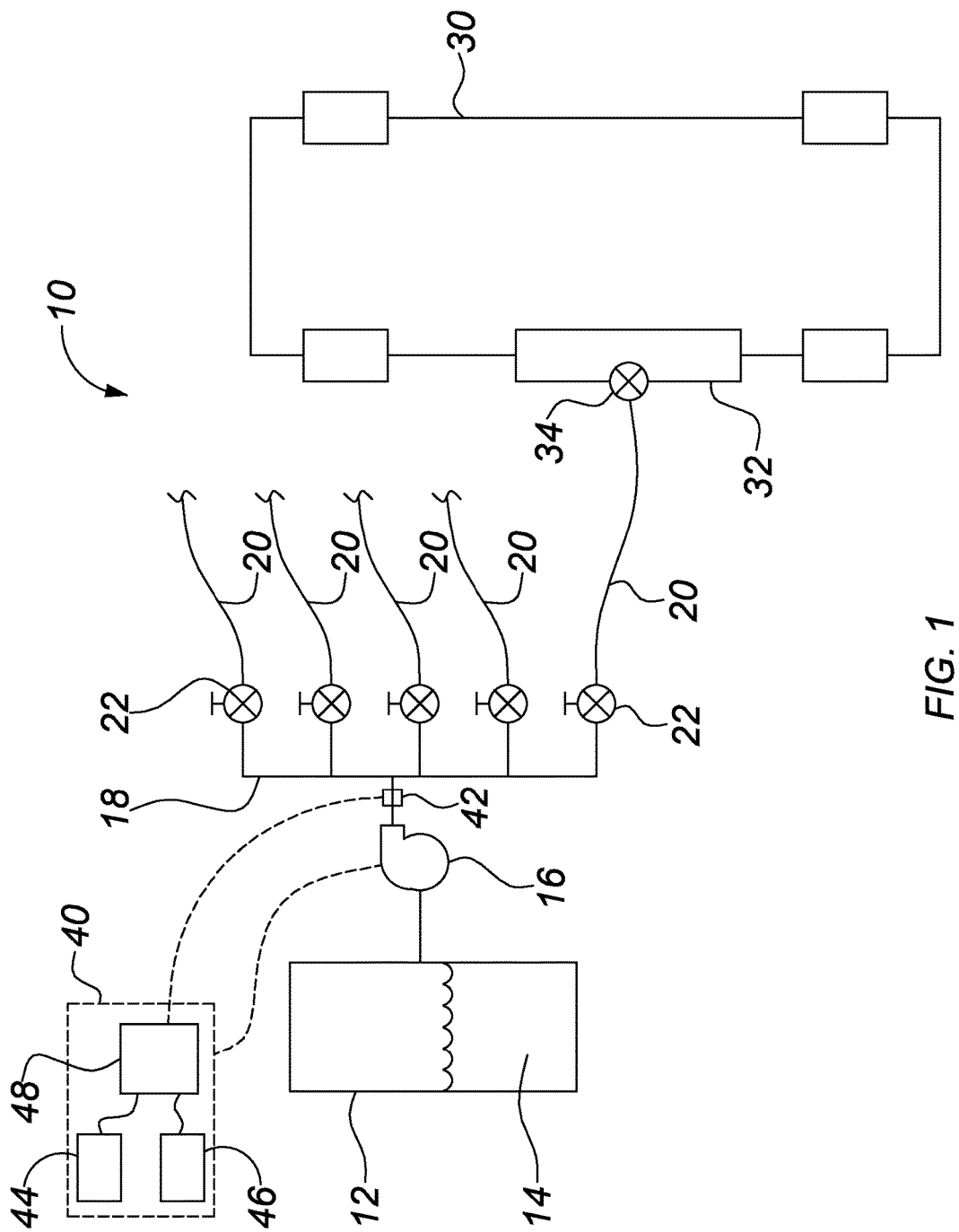
FIG. 1 is a schematic view of a fuel delivery system according to a first embodiment of the present invention.

Referring to FIG. 1, a system for refuelling a plurality of continuously operating vehicles according to a first embodiment of the invention is shown generally at 10. The system comprises a fuel tank 12 containing a quantity of a fuel source 14, a pump 16 operable to draw the fuel source out of the tank and a distribution manifold 18 to distribute the pumped fuel to a plurality of fuel supply lines 20 to a plurality of vehicles 30.

As further illustrated in FIG. 1, each fuel line 20 includes a shut off valve 22 as are commonly known and terminates at a vehicle 30 (only one shown in FIG. 1) having a vehicle mounted fuel tank 32 adapted to store a quantity of the fuel. Each vehicle mounted fuel tank 32 includes a mechanical valve 34 adapted to permit fuel to flow therethrough when a fuel level is below a predetermined level in the vehicle mounted fuel tank 32 and to stop flow therethrough when the fuel level is above a predetermined level as will be more fully described below. As illustrated in FIG. 1, each fuel line 20 may also include a shut off valve for permitting fuel to be permitted to flow into each fuel line as desired by an operator.

The system 10 also includes a control module 40 adapted to control the operation of the pump 16. Optionally, the system may include a pressure sensor 42 adapted to measure the pressure within the distribution manifold 18 or any other location within the fuel line as desired. The control module 40 is adapted to interrupt operation of the pump 16 upon the pressure sensor 42 measuring a pressure indicative of a fuel leak within the system. The control module 40 may include a user interface 44 and memory 46 for storing pressure thresholds and run times as will be more fully described below.

Figure 2:
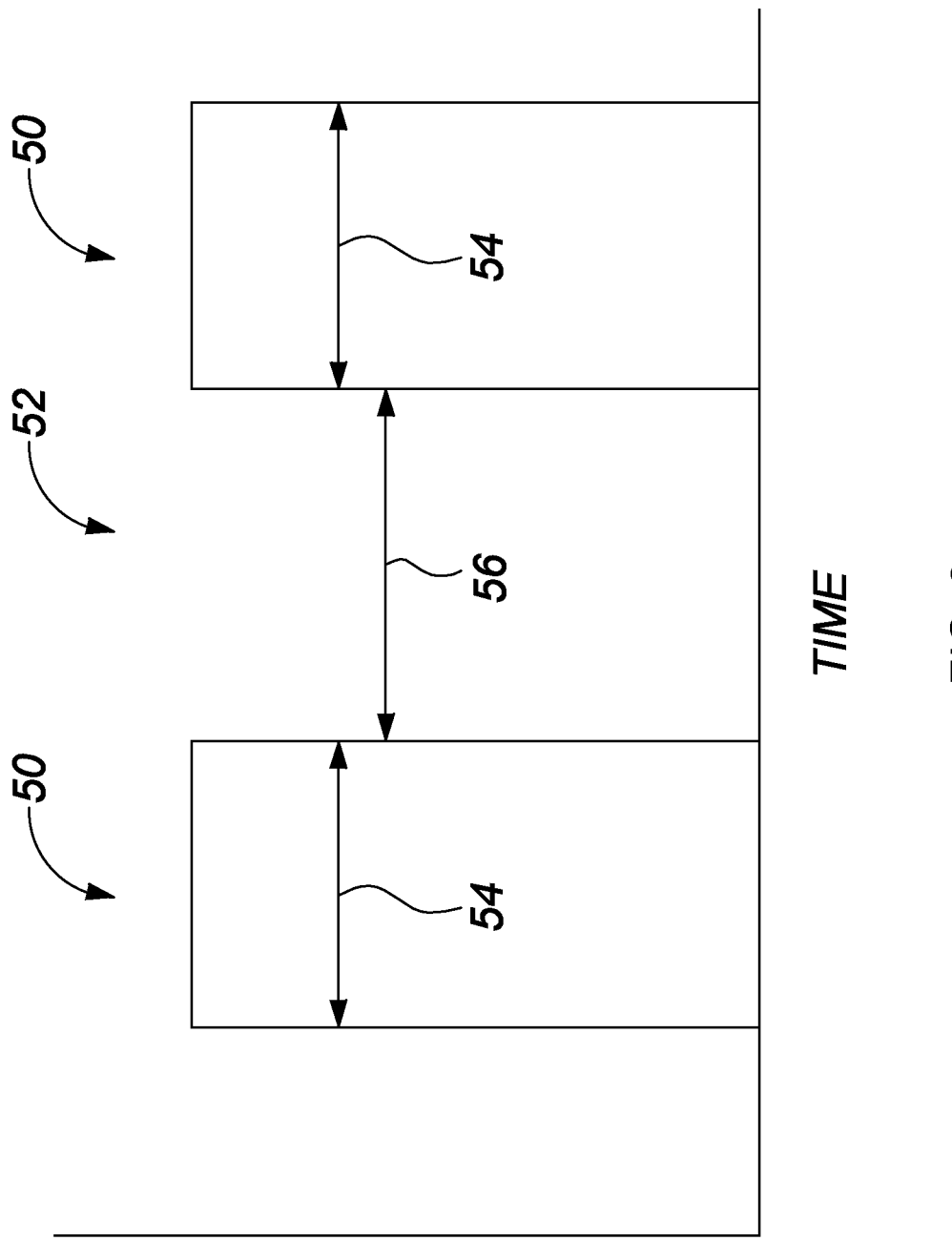
FIG. 2 is an illustration of the timing of the system of FIG. 1.

The control module 40 includes a processor circuit operable to start and stop the pump 16 according to predetermine parameters. In particular, the control module 40 is adapted to cause the pump 16 to run for an amount of time sufficient to fill the each of the vehicle mounted tanks 32 to a predetermined level and also to turn the pump 16 off for an amount of time sufficient for the vehicles 30 to empty their tanks 32 to a predetermined level. In such manner, each of the vehicle mounted tanks 32 will be filled at the same time while reducing the periods in which the pump is required to run. It will be appreciated that the lengths of the time to fill and empty may be entered by an operator through the interface 44. In particular as illustrated in FIG. 2, the pump 16 may be turned on to a run state 50 for a run period of time 54 in intervals separated by an off state 52 having a length of time 56 selected to correspond when one or more of the tanks will require fuel.

More generally, in this specification, the term "processor circuit" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor circuits will be apparent to those of ordinarily skilled in the art upon review of this specification, and substitution of any such other types of processor circuits is considered not to depart from the scope of the present invention as defined by the claims appended hereto.

Computer code comprising instructions for the processor(s) to carry out the various embodiments, aspects, features, etc. of the present disclosure may reside in the memory 46. In various embodiments, the processor circuit 48 can be implemented as a single-chip, multiple chips and/or other electrical components including one or more integrated circuits and printed circuit boards. The processor circuit 48 together with a suitable operating system may operate to execute instructions in the form of computer code and produce and use data. By way of example and not by way of limitation, the operating system may be Windows-based, Mac-based, or Unix or Linux-based, among other suitable operating systems. Operating systems are generally well known and will not be described in further detail here.

Memory 46 encompasses one or more storage mediums and generally provides a place to store computer code (e.g., software and/or firmware) and data that are used by the control module 40. It may comprise, for example, electronic, optical, magnetic, or any other storage or transmission device capable of providing the processor circuit 48 with program instructions. Memory 46 may further include a floppy disk, CD-ROM, DVD, magnetic disk, memory chip, ASIC, FPGA, EEPROM, EPROM, flash memory, optical media, or any other suitable memory from which processor circuit 48 can read instructions in computer programming languages.

Memory 46 may include various other tangible, non-transitory computer-readable media including Read-Only Memory (ROM) and/or Random-Access Memory (RAM). As is well known in the art, ROM acts to transfer data and instructions uni-directionally to the processor circuit 48, and RAM is used typically to transfer data and instructions in a bi-directional manner. In the various embodiments disclosed herein, RAM includes computer program instructions that when executed by the processor circuit 48 cause the processor circuit 48 to execute the program instructions described in greater detail below.

Figure 3:
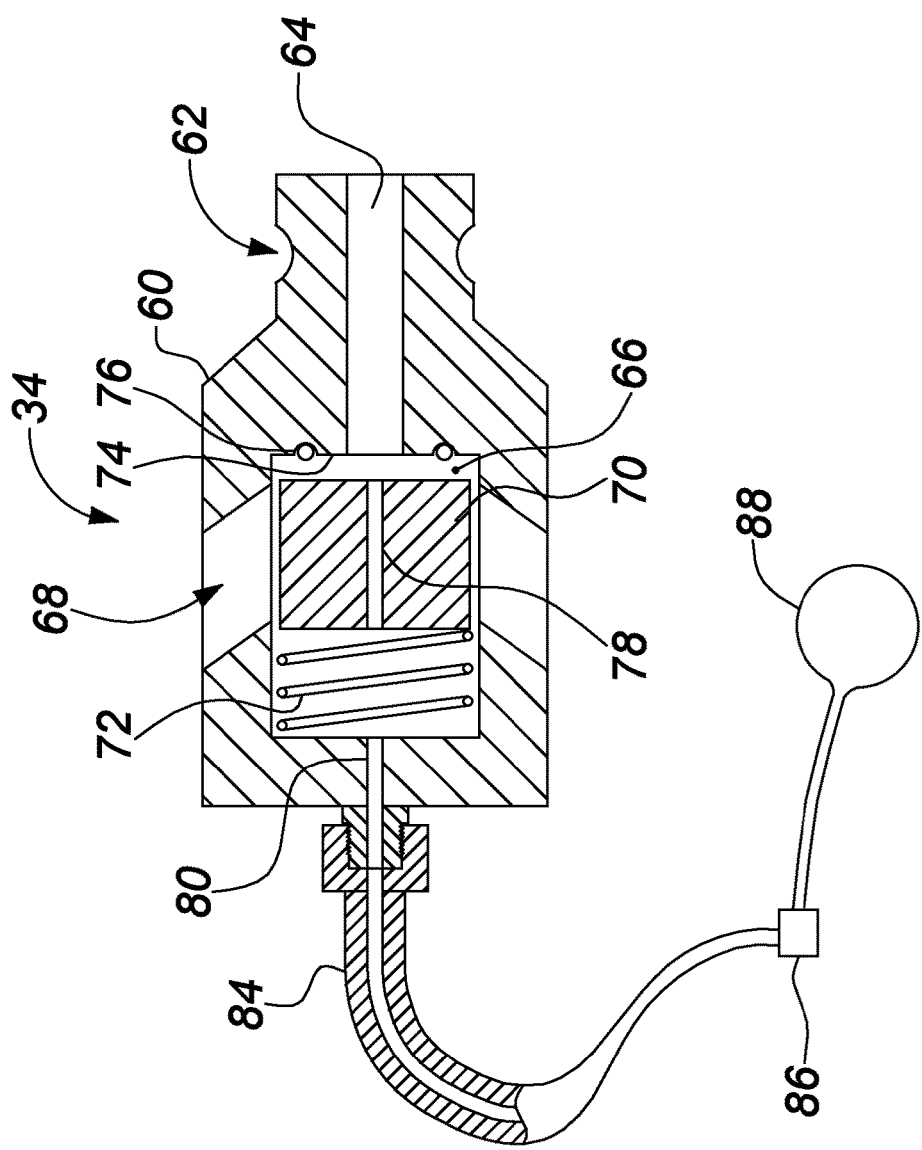
FIG. 3 is a cross sectional view of one of the valves of the system of FIG. 1.

As illustrated in FIG. 1 and set out above, each vehicle mounted tank 32 includes a mechanical valve 34 adapted to shut off flow of fuel into the vehicle mounted tank 32 when the fuel level in that tank is at a predetermined level. Such mechanical valves are known in the art such as set out in U.S. Pat. No. 6,311,723 the entirety of which is hereby incorporated by reference. In particular as illustrated in FIG. 3, an improved design of such valve is illustrated having a valve body 60 having an inlet end 62 with a hose coupler as are commonly known in the art. The valve body 60 includes an inlet port 64 extending through the inlet end 62 in fluidic communication with a fuel line 20 connected thereto and a central cavity 66 within an interior thereof. The central cavity 66 includes a slidable piston 70 slidably movable therein so as to selectably cover or uncover ports 68 extending to the exterior thereof. A biasing spring 72 is locate to an opposite side of the piston 70 from the inlet port 64 so as to bias the piston 70 into contact with an end wall 74 of the central cavity 66.

As illustrated in FIG. 3, the end wall 74 of the central cavity includes an annular seal around the inlet port 64 so as to seal against the piston 70 when abutted thereagainst. Optionally, the annular seal 76 may be included on the end surface of the piston 70. The piston 70 includes a bypass bore 78 therethrough so as to permit fuel to flow therethrough to a position around the biasing spring 72. The valve body 60 also includes a feedback port 80 extending from the central cavity 66 to a pilot line 84. The pilot line 84 includes a float valve 86 at a distal end thereof connected to a float 88 located within the vehicle mounted tank 32.

In operation, flow of fuel through the inlet port 64 will move the piston 70 away from the end wall 74 against the force of the biasing spring 72 so as to uncover the ports 68 thereby permitting fuel to enter the vehicle mounted tank. Additionally, a portion of the fuel will be permitted to flow through the bypass bore 78, feedback port 80 and pilot line 84 to be discharged through the float valve 86 into the vehicle mounted tank. Once the tank is full and the float 88 is raised to a sufficient height by the fuel, the float 88 causes the float valve 86 to close thereby stopping flow of fuel therethrough. Thereafter, fuel will accumulate around the biasing spring 72 thereby balancing the fluid pressure to either side of the piston 70 and permitting the biasing spring 72 to bias the piston back into contact with the end wall 74 shutting off flow through the valve.

While specific embodiments of the invention have been described and illustrated, such embodiments should be considered illustrative of the invention only and not as limiting the invention as construed in accordance with the accompanying claims.

What is claimed is:

1. A system for delivering fuel to a plurality of vehicles comprising:
   a fuel source;
   a pump operable to draw fuel from said fuel source;
   a distribution manifold having a plurality of outlets, said distribution manifold in open fluidic communication with said pump;
   a plurality of fuel lines, each of said plurality of fuel lines connected in free fluidic connection one of said outlets of said distribution manifold;
   a plurality of mechanical valve assemblies, each located in a tank of one of said plurality of vehicles open fluidic communication with each of said plurality of fuel lines, each of said valve assembly being operable to independently shut off flow of fuel therethrough when said tank is filled to a predetermined level,
   wherein each of said mechanical valve assemblies includes a biased piston slidably locatable within a housing and having a sealing face with an o-ring disposed thereon adapted to be sealed into contact with said housing when said tank is filled to said predetermined level, and
   a control circuit programmed to turn said pump on and off at predetermined time intervals independent of said plurality of valve assemblies.

2. The system of claim 1 further comprising a pressure sensor in said distribution manifold.

3. The system of claim 2 wherein said control circuit is adapted to turn off said pump when said pressure sensor detects a pressure drop greater than a predetermined level.

4. The system of claim 1 wherein said piston includes a bore therethrough in fluidic communication with a float valve operable to be closed when said tank is filled to said predetermined level.

5. A method for delivering fuel to a plurality of vehicles comprising:
   providing a fuel source containing a fuel supply;
   pumping said fuel supply from said fuel source to a distribution manifold having a plurality of outlets, said distribution manifold in open fluidic communication with said pump;
   connecting a plurality of fuel lines in free fluidic connection one of said outlets of said distribution manifold;
   locating a mechanical valve assembly in each of a plurality of trucks wherein each of said mechanical valve assemblies includes a biased piston slidably locatable within a housing and having a sealing face with an o-ring disposed thereon adapted to be sealed into contact with said housing when said tank is filled to said predetermined level;
   connecting each of said valve assemblies in open fluidic communication with each of said plurality of fuel lines, each of said valve assembly being operable to independently shut off flow of fuel therethrough when said tank is filled to a predetermined level; and
   with a control circuit, turning said pump on and off at predetermined time intervals independent of said plurality of valve assemblies.

6. The method of claim 5 further comprising a pressure sensor in said distribution manifold.

7. The method of claim 6 wherein said control circuit is adapted to turn off said pump when said pressure sensor detects a pressure drop greater than a predetermined level.

8. The method of claim 5 wherein said piston includes a bore therethrough in fluidic communication with a float valve operable to be closed when said tank is filled to said predetermined level.

* * * * *